US010406803B2

(12) United States Patent
Folkins et al.

(10) Patent No.: US 10,406,803 B2
(45) Date of Patent: Sep. 10, 2019

(54) METHOD FOR PROVIDING COLOR AND MATERIAL PROPERTY OPTIONS IN A THREE-DIMENSIONAL OBJECT PRINTER

(71) Applicant: Xerox Corporation, Norwalk, CT (US)

(72) Inventors: Jeffrey J. Folkins, Rochester, NY (US); Barry P. Mandel, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 279 days.

(21) Appl. No.: 15/372,988

(22) Filed: Dec. 8, 2016

(65) Prior Publication Data

US 2018/0162063 A1 Jun. 14, 2018

(51) Int. Cl.
*B33Y 80/00* (2015.01)
*B33Y 10/00* (2015.01)
*B33Y 30/00* (2015.01)
*B33Y 50/02* (2015.01)
*B29C 64/112* (2017.01)
*B29C 64/386* (2017.01)
*B29C 64/40* (2017.01)
(Continued)

(52) U.S. Cl.
CPC .......... *B33Y 80/00* (2014.12); *B29C 64/112* (2017.08); *B29C 64/386* (2017.08); *B29C 64/40* (2017.08); *B33Y 10/00* (2014.12); *B33Y 30/00* (2014.12); *B33Y 50/02* (2014.12); *B29K 2105/0058* (2013.01); *B29K 2995/002* (2013.01); *B29L 2031/5209* (2013.01)

(58) Field of Classification Search
CPC ......... B33Y 80/00; B33Y 10/00; B33Y 30/00; B33Y 50/02; B29C 64/112; B29C 64/386; B29C 64/40

USPC ......................................................... 264/308
See application file for complete search history.

(56) References Cited

U.S. PATENT DOCUMENTS

2010/0026775 A1 2/2010 Parsi et al.
2015/0352839 A1* 12/2015 Folkins ................. B33Y 50/02
347/14
(Continued)

OTHER PUBLICATIONS

Neri Oxman; Variable property rapid prototyping; Virtual and Physical Prototyping; Mar. 2011; pp. 3-31; vol. 6, Issue No. 1; Taylor & Francis Group, www.tandf.co.uk/journals.
(Continued)

*Primary Examiner* — Christina A Johnson
*Assistant Examiner* — Xue H Liu
(74) *Attorney, Agent, or Firm* — Maginot Moore & Beck LLP (57) ABSTRACT

A method of manufacturing a three-dimensional object comprises: selecting a first ejector in a plurality of ejectors of a three-dimensional object printer with reference to a hardness identifier, the first ejector configured to eject a first material; selecting a second ejector in the plurality of ejectors with reference to a color identifier, the second ejector configured to eject a second material having a hardness that is different than a hardness of the first material; operating the first ejector to eject the first material toward a platen to form an inner portion of the object with the first material; and operating the second ejector to eject the second material toward the platen to form an outer layer of the object with the second material, the outer layer of the object surrounding at least a portion of the inner portion of the object.

8 Claims, 4 Drawing Sheets

(51) Int. Cl.
*B29K 105/00* (2006.01)
*B29L 31/52* (2006.01)

(56) References Cited

U.S. PATENT DOCUMENTS

2016/0096318 A1    4/2016  Bickel et al.
2016/0135493 A1    5/2016  Kuo et al.
2016/0244628 A1    8/2016  Breton et al.
2016/0339635 A1*  11/2016  Nystrom ................ B29C 64/20

OTHER PUBLICATIONS

RoVa4D Full Color; Aug. 2016; 3 Pages; RoVa4D Full Colour Blender 3D Printer on Kickstarter/All3DP, www.all3dp.com/rova4d-full-colour-blender-3d-printer.

* cited by examiner

METHOD FOR PROVIDING COLOR AND MATERIAL PROPERTY OPTIONS IN A THREE-DIMENSIONAL OBJECT PRINTER

TECHNICAL FIELD

The device and method disclosed in this document relates to three-dimensional object printing and, more particularly, to a method for providing more color and material property options with fewer total materials.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads deposit material to build up a part. Material is typically deposited in discrete quantities in a controlled manner to form layers that collectively form the part. The initial layer of material is deposited onto a substrate, and subsequent layers are deposited on top of previous layers. The substrate is supported on a platform that can be moved relative to the ejection heads so each layer can be printed; either the substrate is moved via operation of actuators operatively connected to the platform, or the ejector heads are moved via operation of actuators operatively connected to the ejector heads. Three-dimensional object printing is distinguishable from traditional object-forming techniques, which mostly rely on the removal of material from a work piece by a subtractive process, such as cutting or drilling.

In a conventional three-dimensional object printing system, six different build materials are typically used to print three-dimensional objects in full color. In many three-dimensional object printing systems, full color requires a cyan build material, a yellow build material, a magenta build material, a black build material, a white build material, and a clear build material. In order to print three-dimensional objects with different material properties (e.g. hardness, elasticity, plasticity, fracture, or rheology), a full set of build materials are required for each level of the material property. For example, a printing system that is enabled to print three-dimensional objects in full color and with variations in hardness usually requires a fairly large number of build materials and a correspondingly large number of ejectors or ejector heads. For example, a printing system that is enabled to print three-dimensional objects in full color and with six variations in hardness would require build materials having six different levels of hardness in each of the six different colors (i.e. thirty-six different build materials). As a result, the cost of such a printing system can be very high.

Therefore, a printing system that could provide a full color gamut, as well as variable hardness without a substantial increase in the number of different build materials required, would be beneficial. Implementing such a printing system without other increases in cost or hardware complexity would also be advantageous.

SUMMARY

A method of manufacturing a three-dimensional object is disclosed. The method includes: selecting a first ejector in a plurality of ejectors of a three-dimensional object printer with reference to a hardness identifier, the first ejector configured to eject a first material; selecting a second ejector in the plurality of ejectors with reference to a color identifier, the second ejector configured to eject a second material having a hardness that is different than a hardness of the first material; operating the first ejector to eject the first material toward a platen to form an inner portion of the object with the first material; and operating the second ejector to eject the second material toward the platen to form an outer layer of the object with the second material, the outer layer of the object surrounding at least a portion of the inner portion of the object.

A three-dimensional object printer is disclosed. The three-dimensional object printer includes: a platen; a plurality of ejectors configured to eject material toward the platen, each ejector in the plurality of ejectors configured to eject a different material; and a controller operatively connected to the plurality of ejectors. The controller is configured to: select a first ejector in a plurality of ejectors of a three-dimensional object printer with reference to a hardness identifier, the first ejector configured to eject a first material; select a second ejector in the plurality of ejectors with reference to a color identifier, the second ejector configured to eject a second material having a hardness that is different than a hardness of the first material; operate the first ejector to eject the first material toward a platen to form an inner portion of the object with the first material; and operate the second ejector to eject the second material toward the platen to form an outer layer of the object with the second material, the outer layer of the object surrounding at least a portion of the inner portion of the object.

BRIEF DESCRIPTION OF THE DRAWINGS

The foregoing aspects and other features of the method and printer are explained in the following description, taken in connection with the accompanying drawings.

DETAILED DESCRIPTION

For a general understanding of the environment for the method and printer disclosed herein as well as the details for the method and printer, reference is made to the drawings. In the drawings, like reference numerals designate like elements.

Figure 1:
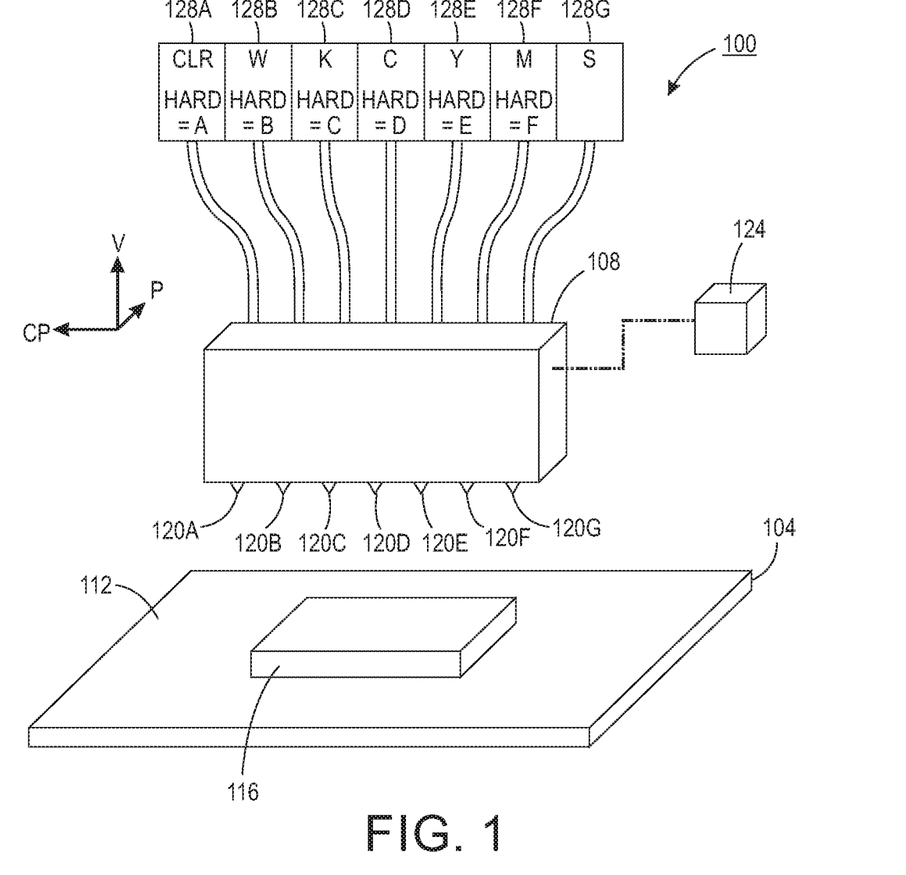
FIG. 1 shows a three-dimensional object printer that can provide a wide gamut of colors and hardnesses in three-dimensional objects formed by the printer without requiring numerous sources of materials.

FIG. 1 shows a three-dimensional object printer 100. The printer 100 comprises a platen 104 and at least one ejector head 108. The ejector head 108 has a plurality of ejectors configured to eject drops of build material towards a surface 112 of the platen 104 to form a three-dimensional object, such as the object 116. Particularly, the ejector head 108 has a plurality of ejectors 120a-f configured to eject drops of a build material to form a three-dimensional object. In some embodiments, the ejector head 108 has at least one ejector 120g configured to eject drops of a support material, such as wax, to form support for the object 116 being formed. As used in this document, "support" means one or more layers of support material that enable layers of build material for a portion of the object to be formed without gravity or laminar flow of the build material causing deformation. This support material is later removed from the finished part. The particular arrangement of the ejectors 120a-g shown in FIG. 1 is merely for illustrative purposes. In some embodiments, the ejectors 120a-g may be arranged in several rows or columns and may be arranged in separate one or more separate ejector heads. The ejector head 108 is configured to move relative to the platen 104 in the process direction P, the cross-process direction CP, and the vertical direction V. In some embodiments, the printer 100 includes actuators configured to move one or both of the ejector head 108 and the platen 104 with respect to one another.

The printer 100 includes a controller 124 operatively connected to at least the ejector head 108. The controller 124 is configured to operate the ejector head 108 with reference to image data to form a three-dimensional object on the platen surface 112 that corresponds to the image data. In some embodiments, the image data comprise a three-dimensional model that indicates a shape and size of an object to be formed. To form each layer of the three-dimensional object, the controller 124 operates actuators of the printer 100 to sweep the ejector head 108 one or more times in the process direction P, while ejecting drops of material onto the platen 104. In the case of multiple passes, the ejector head 108 shifts in the cross-process direction CP between each sweep. After each layer is formed, the ejector head 108 moves away from the platen 104 in the vertical direction V to begin printing the next layer.

To enable the printer 100 to print three-dimensional objects in full color, the printer 100 includes a plurality of material supplies 128a-g operably connected to the ejector head 108 and configured to feed different materials to the ejectors 120a-g of the ejector head 108. In the exemplary embodiment shown, the material supply 128a supplies a clear or transparent build material to at least one ejector 120a of the ejector head 108. The material supply 128b supplies a white build material to at least one ejector 120b of the ejector head 108. The material supply 128c supplies a black build material to at least one ejector 120c of the ejector head 108. The material supply 128d supplies a cyan build material to at least one ejector 120d of the ejector head 108. The material supply 128e supplies a yellow build material to at least one ejector 120e of the ejector head 108. The material supply 128f supplies a magenta build material to at least one ejector 120f of the ejector head 108. Finally, the material supply 128g supplies a support material, such as wax, to at least one ejector 120g of the ejector head 108. As noted above, the particular arrangement of the ejectors 120a-g shown in FIG. 1 is merely for illustrative purposes. In some embodiments, each of the material supplies 128a-g is configured to feed a plurality of ejectors arranged in one or more rows or columns.

Additionally, to enable the printer 100 to print three-dimensional objects with variations in hardness, the material supplies 128a-f supply build materials having different hardnesses. As used herein, the term "hardness" refers to one or more mechanical or rheological properties relating to a material including but not limited to elasticity, plasticity, viscosity, viscoelasticity, strength, brittleness/ductility, and toughness, as well as one or more quantifiable metrics relating to a material including but not limited to shear modulus, yield strength, stress-strain curves, compressive strength, shear strength, and tensile strength. Particularly, at least one of the material supplies 128a-f supplies a build material having a different hardness than the other build materials. In some embodiments, each of the build materials supplied by the material supplies 128a-f has a different hardness. For example, in the embodiment shown, the clear or transparent build material has hardness A. The white build material has hardness B. The black build material has hardness C. The cyan build material has hardness D. The yellow build material has hardness E. Finally, the magenta build material has hardness F. In an alternative embodiment, the clear or transparent build material is soft, having hardness A for example, and each of the other the build materials are hard, having a hardness B for example. It is noted that many other combinations of hardnesses are possible, as long as at least one build material has a different hardness than the other build materials. Additionally, as used in these examples, the hardnesses A, B, C, D, E, and F refer to distinct sets of material properties that define the hardness of the respect material. In one embodiment, the hardnesses A, B, C, D, E, and F are progressively harder from A to F, according to at least one quantifiable metric. In other embodiments, the hardnesses A, B, C, D, E, and F are some other advantageous combination that enables a wide gamut of hardnesses to be achieved.

Figure 2:
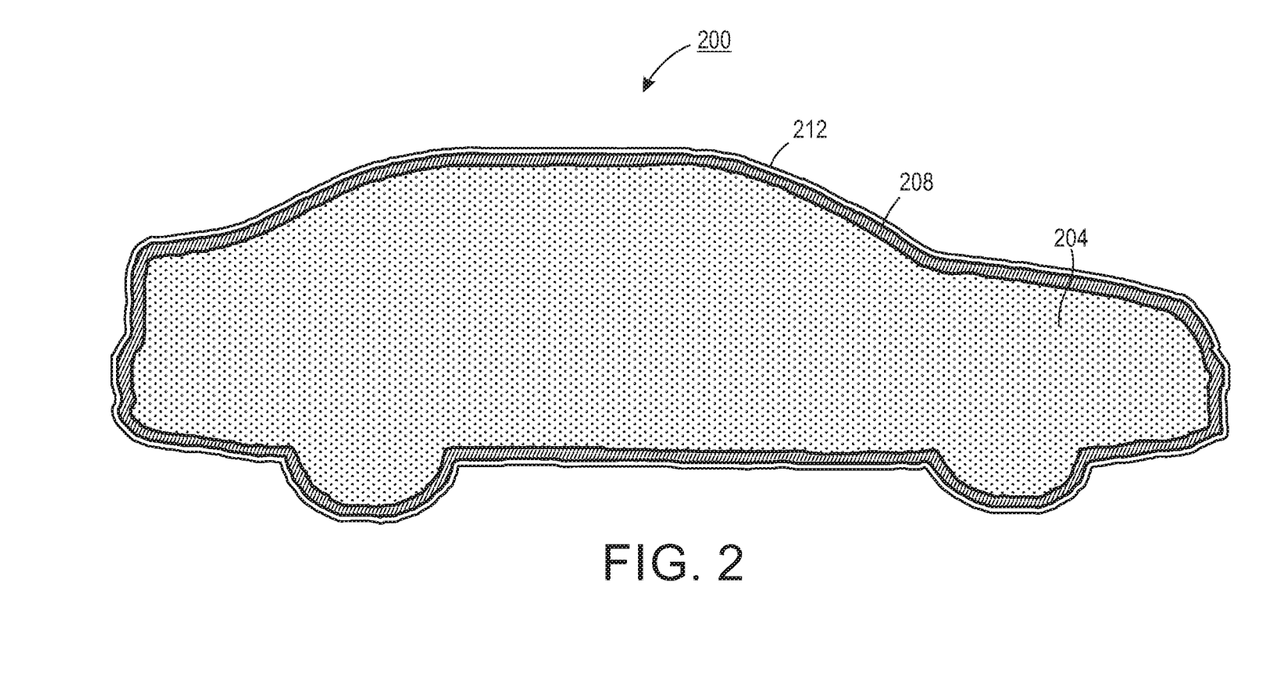
FIG. 2 shows a three-dimensional object formed by the printer of FIG. 1.

FIG. 2 shows an object 200, illustrated as a toy car, which is formed by the printer 100 with reference to image data. In addition to a three-dimensional model, or similar data set, of the object 200, the image data further include color data and hardness data associated with the three-dimensional model. The color data comprise a plurality of color identifiers associated with a plurality of locations or regions on an exterior surface of the object 200. Each color identifier comprises data that identify a particular color to enable the controller to produce that identified color in a portion of the three-dimensional object being formed from the materials ejected by the ejectors of the system. The hardness data comprise one or more hardness identifiers associated with one or more regions of the object 200. Each hardness identifier comprises data that identify a particular hardness to enable the controller to produce that identified hardness in a portion of the three-dimensional object being formed from the materials ejected by the ejectors of the system.

As shown, the object 200 includes an inner portion 204, which is surrounded by an outer layer 208. The printer 100 is configured to form the inner portion 204 with reference to the hardness data of the image data. When forming the inner portion 204, the particular colors of the build materials used need not be taken into consideration. Instead, the printer 100 need only take into consideration the hardnesses of the particular build materials. Particularly, the printer 100 is configured to form the inside portion 204 using one of the build materials or combination of the build materials such that the inner portion 204 has hardness corresponding to the hardness identifiers of the hardness data.

For example, in one embodiment, if the hardness data indicate that the object 200 should have hardness C, then the printer 100 is configured to form the inner portion 204 of the object 200 with the black build material because the black build material has hardness C. Alternatively, in one embodiment, if the hardness data indicate that the object 200 should have hardness X the printer 100 is configured to form the inner portion 204 with a mix of the build materials, such as a mix of the cyan build material having harness D and the white build material having hardness B, which are selected to form the inner portion 204 with an approximate hardness X. In some embodiments, the build materials are blended with a ratio such that the inner portion 204 has an overall hardness that corresponds to the hardness identifiers of the hardness data. Methods for selecting which build materials are used to form the inner portion 204 are discussed in greater detail below.

Similarly, the printer 100 is configured to form the outer layer 208 with reference to the color data of the image data. When forming the outer layer 208, the particular hardnesses of the build materials used need not be taken into consideration. Instead, the printer 100 need only take into consideration the colors of the particular build materials. Particularly, the printer 100 is configured to form the outer layer 208 using one of the build materials or combination of the build materials such that the outer layer 208 has a coloration corresponding to the plurality of color identifiers of the color data.

For example, in one embodiment, if the plurality of color identifiers indicates that a portion of the object 200 should have a solid green coloration, then the printer 100 is configured to form that portion of the outer layer 208 of the object 200 with a blend of the cyan build material and the yellow build material, resulting in the object 200 appearing green. As another example, in one embodiment, if the plurality of color identifiers indicates that the object 200 should be red at certain portions of the exterior surface (such as portions corresponding to a body of the toy car) and black at other portions of the exterior surface (such as portions corresponding to wheels of the toy car), then the printer 100 is configured to form the red portions of the outer layer 208 a blend of the yellow build material and the magenta build material and to form the black portions of the outer layer 208 with the black build material. In some embodiments, at least for certain colors, the printer 100 is configured to form a base layer of the white build material, which is then covered with the material or blend of materials corresponding to the color identifier. Methods for selecting which build materials are used to form the outer layer 208 are discussed in greater detail below.

Using the methods describe herein, the printer 100 is enabled to form objects, such as the object 200, in full color and with variation in hardness. Since the inner portion 204 comprises most of the volume of object 200, the hardness of the inner portion 204 essentially defines the hardness of the object 200 as a whole. The outer layer 208 is formed as a thin layer that surrounds the inner portion 208. Therefore, regardless of the hardnesses of the build materials used to form the outer layer 208, the outer layer 208 remains flexible and does not substantially alter the overall hardness of the object 200. Similarly, since the outer layer 208 conceals the inner portion 204, only the coloration of the outer layer 208 is seen and the particular coloration of the inner portion 204 is hidden from sight.

In some embodiments, the object 200 further includes a thin overcoat layer 212, which defines a texture of the object 200. Particularly, in some embodiments, the image data further include texture data associated with the three-dimensional model. The texture data comprise one or more texture identifiers associated with one or more regions of the object 200. Each texture identifier comprises data that identify a particular texture to enable the controller to produce that identified texture on a portion of the three-dimensional object being formed from the materials ejected by the ejectors of the system. As used herein, the term "texture" refers to one or more metrics or descriptors that define a particular quality of a surface, such stickiness, lay, roughness, or waviness.

In some embodiments, the clear or transparent build material has an alternative surface texture that differs from a surface texture of the rest of the build materials. In one embodiment, the clear build material has a sticky or rough surface texture, whereas the rest of the build materials have a smooth surface texture. The printer 100 is configured to determine whether or not and/or how much to form the overcoat layer 212 with reference to the texture data. Particularly, in response to the texture data indicating that the object 200 should have the alternative surface texture of the clear build material, the printer 100 is configured to form the overcoat layer 212 with the clear build material having the alternative surface texture. In response to the texture data indicating that the object 200 should have the surface texture of the rest of the build materials, the printer 100 is configured to not form the overcoat layer 212. In some embodiments, the printer 100 is configured to form partial coatings of the overcoat layer 212 to achieve intermediate textures.

Figure 3:
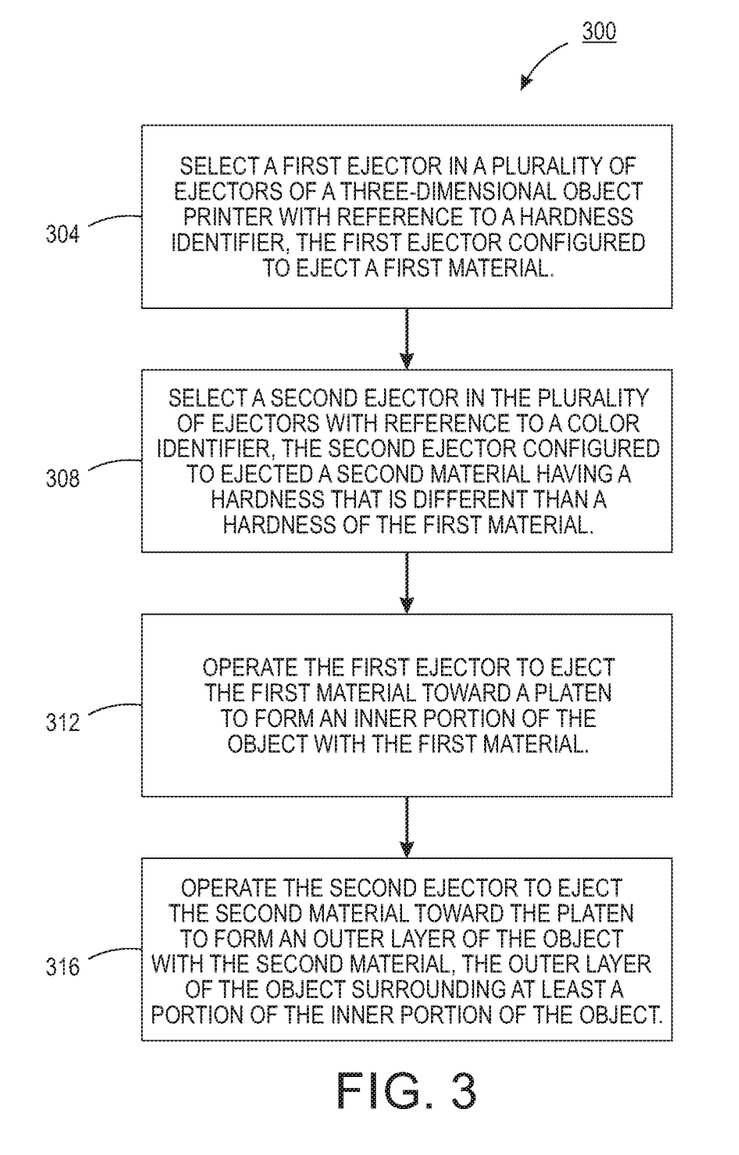
FIG. 3 shows a method of operating a three-dimensional object printer.

A method 300 for operating a three-dimensional object printer is shown in FIG. 3. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 124 of the printer 100 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the steps are described.

When the method 300 is performed, it begins by selecting a first ejector, which is configured to eject a first material, in a plurality of ejectors of a three-dimensional object printer with reference to a hardness identifier (block 304). Particularly, with respect to the embodiments described in detail herein, the controller 124 is configured to receive image data that includes hardness data. As discussed above, the hardness data comprise one or more hardness identifiers associated with one or more regions of the object to be formed. The controller 124 is configured to select or identify at least one ejector in the plurality of ejectors 120*a-f* with reference to at least one hardness identifier of the hardness data. In a case in which different regions of the object have different corresponding hardness identifiers, the controller 124 is configured to select at least one ejector in the plurality of ejectors 120*a-f* for each different region with reference to the hardness identifier corresponding to the respective region. In some embodiments, the controller 124 is configured to select the ejector in the plurality of ejectors 120*a-f* that ejects a build material having a hardness that is equal to or within a predetermined range or variance from a corresponding hardness identifier. For example, in one embodiment, the controller 124 is configured to select the ejector 120*b*, which ejects the white build material having hardness B, in response to a corresponding hardness identifier X being equal to B or within a predetermined range or variance about B. As discussed above, the hardness B essentially corresponds to a set of one or more material properties and metrics that define the hardness of the white build material. The corresponding hardness identifier X may identify a set of one or more material properties and metrics that define the hardness X. The printer 100 is configured to select the ejector 120, which ejects the build material having a hardness that best approximates the hardness X.

In some embodiments of the method 300, the selecting of the first ejector (block 304) comprises selecting the first ejector and another ejector in the plurality of ejectors with reference to the hardness identifier, the other ejector being configured to eject another material that is different than the first material. Particularly, the controller 124 is configured to select or identify at least two ejectors in the plurality of ejectors 120a-f with reference to at least one hardness identifier of the hardness data. In a case in which different regions of the object have different corresponding hardness identifiers, the controller 124 is configured to select at least two ejectors in the plurality of ejectors 120a-f for each different region with reference to the hardness identifier corresponding to the respective region. More particularly, in response to none of the available build materials having a hardness that is equal to or within a predetermined range or variance of a corresponding hardness identifier, the controller 124 is configured to select at least two ejectors in the plurality of ejectors 120a-f that can eject build materials that can be blended to achieve a hardness equal to the corresponding hardness identifier.

In some embodiments, the controller 124 is configured to select one ejector in the plurality of ejectors 120a-f that ejects a build material that is softer than a corresponding hardness identifier and another ejector in the plurality of ejectors 120a-f that ejects a build material that is harder than the corresponding hardness identifier. For example, in one embodiment, the controller 124 is configured to select the ejector 120b, which ejects the white build material having hardness B, and the ejector 120e, which ejects the yellow build material having hardness E, in response to the hardness B being softer than a corresponding hardness identifier Y and the hardness E being harder than the corresponding hardness identifier Y. In one embodiment, the selected ejectors are the two ejectors in the plurality of ejectors 120a-f that eject the build materials having hardnesses that are closest to a respective hardness identifier. For example, in one embodiment, the controller 124 is configured to select the ejector 120c, which ejects the black build material having hardness C, and the ejector 120d, which ejects the cyan build material having hardness D, in response to the hardnesses C and D being closest to the corresponding hardness identifier Y. As discussed above, the hardnesses essentially correspond to a set of one or more material properties and metrics that define the hardnesses of the respective material. The corresponding hardness identifier Y may identify a set of one or more material properties and metrics that define hardness Y. The printer 100 is configured to select the ejectors 120, which eject the build materials having hardnesses that when blended together with an appropriate ratio best approximates the hardness Y. In some embodiments, the particular combination of build materials used to achieve a particular hardness can depend on further considerations, such as a remaining available supply of each build material or a cost of each of the available build materials.

Next, the method 300 continues with selecting a second ejector in the plurality of ejectors with reference to a color identifier, the second ejector being configured to eject a second material having a hardness that is different than a hardness of the first material (block 308). Particularly, with respect to the embodiments described in detail herein, the controller 124 is configured to receive image data that further includes color data. As discussed above, the color data comprise a plurality of color identifiers associated with a plurality of locations or regions on an exterior surface of the object to be formed. The controller 124 is configured to select or identify at least one ejector in the plurality of ejectors 120a-f with reference to at least one color identifier of the color data. In a case in which different regions of the exterior surface of the object have different corresponding color identifiers, the controller 124 is configured to select at least one ejector in the plurality of ejectors 120a-f for each different region with reference to the color identifier corresponding to the respective region. In some embodiments, the controller 124 is configured to select the ejector in the plurality of ejectors 120a-f that ejects the build material having a color that is equal to a corresponding color identifier. For example, in one embodiment, the controller 124 is configured to select the ejector 120e, which ejects the yellow build material, in response to the corresponding color identifier indicating the color yellow.

In some embodiments of the method 300, the selecting of the second ejector (block 308) comprises selecting the second ejector and another ejector in the plurality of ejectors with reference to the color identifier, the other ejector being configured to eject another material that is different than the second material. Particularly, the controller 124 is configured to select or identify at least two ejectors in the plurality of ejectors 120a-f with reference to at least one color identifier of the color data. In a case in which different regions of the exterior surface of the object have different corresponding color identifiers, the controller 124 is configured to select at least two ejectors in the plurality of ejectors 120a-f for each different region with reference to the color identifier corresponding to the respective region. More particularly, in response to none of the available build materials having a color that is equal to a corresponding color identifier, the controller 124 is configured to select at least two ejectors in the plurality of ejectors 120a-f that can eject build materials that can be blended to achieve a color equal to the corresponding color identifier. For example, in one embodiment, the controller 124 is configured to select the ejector 120d, which ejects the cyan build material, and the ejector 120e, which ejects the yellow build material, in response to the corresponding color identifier indicating the color green.

Next, the method 300 continues with operating the first ejector to eject the first material toward a platen to form an inner portion of the object with the first material (block 312). Particularly, with respect to the embodiments described in detail herein, the controller 124 is configured to operate the selected ejector for forming the inner portion of the object to eject build material toward the platen to form an inner portion of the object (such as the inner portion 204 of the object 200). In a case in which different regions of the object have different corresponding hardness identifiers, the controller 124 is configured to operate the selected ejector for forming each region of the inner portion of the object to eject build material toward the platen to form each region of the inner portion of the object. With respect to the example above, in which the ejector 120b was selected with reference to the hardness identifier X, the controller 124 is configured to operate the ejector 120b to eject drops of the white build material to form the inner portion of the object with a hardness B, which best approximates the hardness X.

In some embodiments of the method 300, the operating of the first ejector (block 312) comprises operating the first ejector and the other ejector to eject the first material and the other material toward the platen to form the inner portion of the object, the first material and the other material mixing to form the inner portion of the object with a hardness corresponding to the hardness identifier. As discussed above, if none of the available build materials have a hardness that is equal to or within a predetermined range of a corresponding hardness identifier, multiple ejectors are selected to eject build materials that can be blended to achieve a hardness equal to the corresponding hardness identifier. Particularly, the controller 124 is configured to operate the selected ejectors for forming the inner portion of the object to eject build material toward the platen to form the inner portion of the object with a blend of the respective build materials such that the inner portion of the object has a hardness corresponding to the hardness identifier. In a case in which different regions of the object have different corresponding hardness identifiers, the controller 124 is configured to operate the selected ejectors for forming each region of the inner portion of the object to eject build material toward the platen to form each region of the inner portion of the object with a blend of the respective build materials such that each region of the inner portion of the object has a hardness corresponding to the respective hardness identifier. In some embodiments, the controller 124 is configured to operate the ejectors to blend the build materials with proportions that depend on the hardness identifier. In some embodiments, the controller 124 is configured to operate the ejectors to blend the build materials with a half-toning scheme. With respect to the example above, in which the ejector 120*c* and the ejector 120*d* were selected with reference the hardness identifier Y, the controller 124 is configured to operate the ejector 120*c* and the ejector 120*d* to eject drops of the black build material and the cyan build material to form the inner portion of the object with a hardness that best approximates the hardness Y.

Finally, the method 300 continues with operating the second ejector to eject the second material toward the platen to form an outer layer of the object with the second material, the outer layer of the object surrounding the inner portion of the object (block 316). Particularly, with respect to the embodiments described in detail herein, the controller 124 is configured to operate the selected ejector to eject build material toward the platen to form the outer layer of the object with a coloration corresponding to the respective color identifier (similar to the outer layer 208 of the object 200). In a case in which different regions of the exterior surface of the object have different corresponding color identifiers, the controller 124 is configured to operate the selected ejector for forming each region of the outer layer of the object to eject build material toward the platen to form each region of the outer layer of the object with a coloration corresponding to the respective color identifiers. With respect to the example above, in which the ejector 120*e* was selected with reference the yellow color identifier, the controller 124 is configured to operate the ejector 120*e* to eject drops of the yellow build material to form the outer layer of the object with a yellow coloration.

In some embodiments of the method 300, the operating of the second ejector (block 316) comprises operating the second ejector and the other ejector to eject the second material and the other material toward the platen to form the outer layer of the object, the second material and the other material mixing to form the outer layer of the object with a color corresponding to the color identifier. As discussed above, if none of the available build materials have a color that is equal to a corresponding color identifier, multiple ejectors are selected which are configured to eject build materials that can be blended to achieve a hardness equal to the corresponding hardness identifier. Particularly, the controller 124 is configured to operate the selected ejectors for forming the outer layer of the object to eject build material toward the platen to form the outer layer of the object with a blend of the respective build materials such that the outer layer of the object has a coloration corresponding to the color identifier. In a case in which different regions of the exterior surface of the object have different corresponding color identifiers, the controller 124 is configured to operate the selected ejectors for forming each region of the outer layer of the object to eject build material toward the platen to form each region of the outer layer of the object with a blend of the respective build materials such that the outer layer of the object has a coloration corresponding to the color identifiers. In some embodiments, the controller 124 is configured to operate the ejectors to blend the build materials with proportions that depend on the color identifier. In some embodiments, the controller 124 is configured to operate the ejectors to blend the build materials with a half-toning scheme. With respect to the example above, in which the ejector 120*d* and the ejector 120*e* were selected with reference the green color identifier, the controller 124 is configured to operate the ejector 120*d* and the ejector 120*e* to eject drops of the cyan build material and the yellow build material to form the outer layer with a green coloration.

Figure 4:
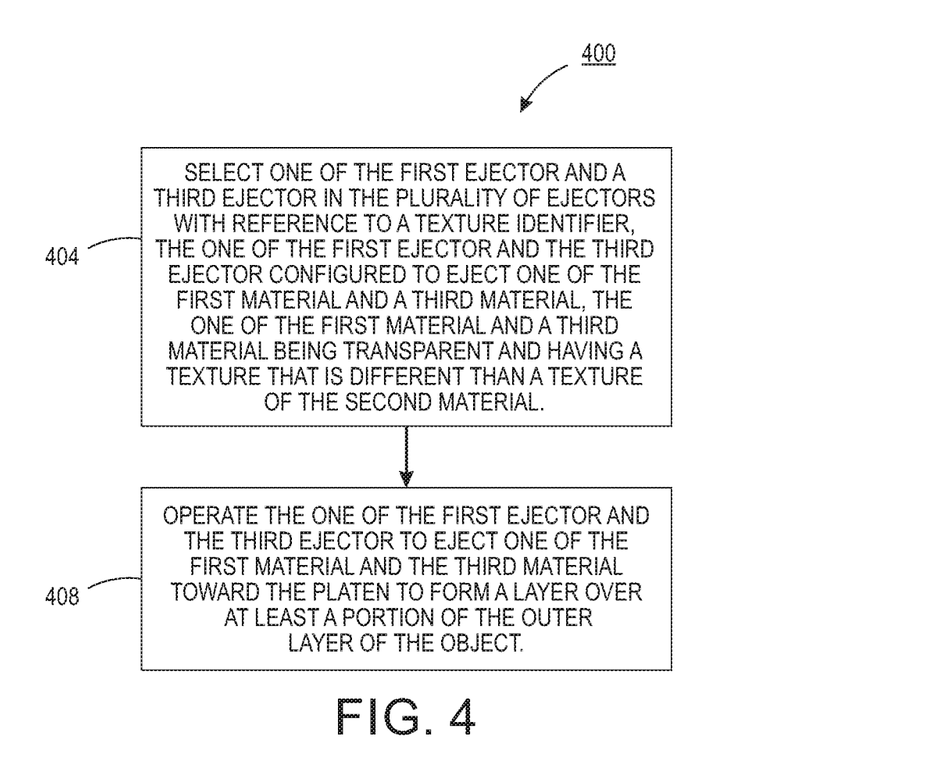
FIG. 4 shows a further method of operating a three-dimensional object printer, which is an extension of the method of FIG. 3.

A method 400 for operating a three-dimensional object printer is shown in FIG. 4. The method 400 is an extension of the method 300, in which a clear overcoat layer is further formed upon the outer layer of the object to alter a surface texture of the object. The method 400 begins with selecting one of the first ejector and a third ejector in the plurality of ejectors with reference to a texture identifier, the one of the first ejector and the third ejector being configured to eject one of the first material and a third material, the one of the first material and a third material being transparent and having a texture that is different than a texture of the second material (block 404). Particularly, with respect to the embodiments described in detail herein, the controller 124 is configured to receive image data that includes texture data. As discussed above, the texture data comprise one or more texture identifiers associated with a plurality of locations or regions on an exterior surface the object to be formed. The controller 124 is configured to select or identify at least one ejector in the plurality of ejectors 120*a-f* with reference to at least one texture identifier of the texture data.

More particularly, in some embodiments, at least one of the ejectors of the printer 100 is configured to eject a clear or transparent build material having a different surface texture than the other build materials (such as the ejector 120*a*). In some embodiments, the printer 100 includes several ejectors configured to eject clear or transparent build materials having different surface textures than the other build materials. In one embodiment, the controller 124 is configured to determine whether or not to form an overcoat layer with reference to the texture data. In response to the texture data indicating that the object to be formed should have an alternative surface texture of one of the clear build materials, the controller 124 is configured to select the ejector configured to eject the respective clear build material having the alternative surface texture. For example, if the clear build material ejected by the ejector 120*a* has a rough surface texture and the texture data indicate that the object should have the rough surface texture, the controller 124 is configured to select the ejector 120*a* for forming the overcoat layer.

The method 400 continues with operating the one of the first ejector and the third ejector to eject one of the first material and the third material toward the platen to form a layer over the outer layer of the object (block 408). Particularly, with respect to the embodiments described in detail herein, the controller 124 is configured to operate the selected ejector for forming the overcoat layer to eject clear build material toward the platen to form the overcoat layer of the object with a texture corresponding to the respective texture identifier (similar to the overcoat layer 212 of the object 200).

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
   a platen;
   a plurality of ejectors configured to eject drops of material toward the platen to form layers of an object to be formed on the platen, each ejector in the plurality of ejectors configured to eject a different material; and
   a controller operatively connected to the plurality of ejectors, the controller configured to:
      receive image data of the object to be formed on the platen;
      select a first ejector in a plurality of ejectors of a three-dimensional object printer with reference to a hardness identifier in the image data associated with a first region of the object, the first ejector configured to eject a first material;
      select a second ejector in the plurality of ejectors with reference to a color identifier in the image data associated with a second region of the object, the second ejector configured to eject a second material having a hardness that is different than a hardness of the first material;
      operate the first ejector using the image data corresponding to the first region to eject the first material toward the platen to form at least a portion of the first region of the object with the first material; and
      operate the second ejector using the image data corresponding to the second region to eject the second material toward the platen to form at least a portion of the second region of the object with the second material, the portion of the second region of the object formed with the second material covering the portion of the first region formed with the first material.

2. The printer according to claim 1, the controller further configured to:
   select the first ejector in response to the hardness of the first material being within a predetermined range of the hardness identifier.

3. The printer according to claim 1, the controller further configured to:
   select the first ejector and another ejector in the plurality of ejectors with reference to the hardness identifier, the other ejector configured to eject another material that has a hardness that is different than a hardness of the first material.

4. The printer according to claim 3, the controller further configured to:
   select the first ejector and the other ejector in response to the hardness of the first material being less than the hardness identifier and the hardness of the other material being greater than the hardness identifier.

5. The printer according to claim 4, the controller further configured to:
   operate the first ejector and the other ejector to eject the first material and the other material toward the platen to form the portion of the first region of the object, the first material and the other material mixing to form the portion of the first region of the object with a hardness corresponding to the hardness identifier.

6. The printer according to claim 1, the controller further configured to:
   select the second ejector and another ejector in the plurality of ejectors with reference to the color identifier, the other ejector configured to eject another material that has a color that is different than a color of the second material and the colors of the other material and the second material are different than a color corresponding to the color identifier.

7. The printer according to claim 6, the controller further configured to:
   operate the second ejector and the other ejector to eject the second material and the other material toward the platen to form the portion of the second region of the object, the second material and the other material mixing to form the portion of the second region of the object with a color corresponding to the color identifier.

8. The printer according to claim 1, the controller further configured to:
   select one of the first ejector and a third ejector in the plurality of ejectors with reference to a texture identifier associated with another region of the object that covers the second region of the object, the one of the first ejector and the third ejector configured to eject one of the first material and a third material, the one of the first material and a third material being transparent and having a texture that is different than a texture of the second material; and
   operate the one of the first ejector and the third ejector to eject one of the first material and the third material toward the platen to form a portion of the other region over the portion of the of the second region of the object.

* * * * *